United States Patent
Li et al.

(10) Patent No.: US 11,553,193 B2
(45) Date of Patent: Jan. 10, 2023

(54) LOW LATENCY LOCAL ILLUMINATION COMPENSATION

(71) Applicant: Tencent America LLC, Palo Alto, CA (US)

(72) Inventors: Xiang Li, Saratoga, CA (US); Xin Zhao, San Diego, CA (US); Xiaozhong Xu, State College, PA (US); Shan Liu, San Jose, CA (US); Meng Xu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/412,645

(22) Filed: Aug. 26, 2021

(65) Prior Publication Data
US 2021/0392343 A1 Dec. 16, 2021

Related U.S. Application Data

(63) Continuation of application No. 16/525,533, filed on Jul. 29, 2019, now Pat. No. 11,146,800.

(60) Provisional application No. 62/785,078, filed on Dec. 26, 2018, provisional application No. 62/735,409, filed on Sep. 24, 2018.

(51) Int. Cl.
*H04N 19/00* (2014.01)
*H04N 19/186* (2014.01)
*H04N 19/176* (2014.01)
*H04N 19/503* (2014.01)

(52) U.S. Cl.
CPC ......... *H04N 19/186* (2014.11); *H04N 19/176* (2014.11); *H04N 19/503* (2014.11)

(58) Field of Classification Search
CPC ..................................................... H04N 19/00
See application file for complete search history.

(56) References Cited

U.S. PATENT DOCUMENTS

| | | | |
|---|---|---|---|
| 2018/0098086 A1* | 4/2018 | Chuang | H04N 19/625 |
| 2018/0192072 A1* | 7/2018 | Chen | H04N 19/139 |

(Continued)

OTHER PUBLICATIONS

"High Efficiency Video Coding", Rec. ITU-T, International Telecommunication Union, H.265, 664 pages, Dec. 2016.

(Continued)

*Primary Examiner* — Maryam A Nasri
(74) *Attorney, Agent, or Firm* — ArentFox Schiff LLP

(57) ABSTRACT

Aspects of the disclosure provide methods and apparatuses for video encoding/decoding. In some examples, an apparatus for video decoding includes processing circuitry that decodes prediction information for a plurality of first blocks in a current coded picture that is a part of a coded video sequence. The prediction information indicates that the plurality of first blocks is coded in a local illumination compensation (LIC) mode. The processing circuitry selects a neighboring region for each of the plurality of first blocks. The selected neighboring region and the respective first block form a second block. The processing circuitry performs an inter prediction for the plurality of second blocks in parallel. The processing circuitry determines a set of LIC parameters for each of the plurality of first blocks based on the selected neighboring region of the respective first block and reconstructs the plurality of first blocks based on the sets of LIC parameters.

19 Claims, 17 Drawing Sheets

(56) References Cited

U.S. PATENT DOCUMENTS

2019/0174136 A1\* 6/2019 Jun ..................... H04N 19/176
2020/0304827 A1\* 9/2020 Abe ..................... H04N 19/523

OTHER PUBLICATIONS

Benjamin Brass et al., "Versatile Video Coding (Draft 2)", JVET-K1001-v7, 138 pages, 11$^{th}$ Meeting: Ljubljana, SI, Jul. 10-18, 2018.
Benjamin Brass et al., "Versatile Video Coding (Draft 3)", JVET-L1001-v9, 234 pages, 12$^{th}$ Meeting: Macao, CN, Oct. 3-12, 2018.
Chih-Wei Hsu et al., "Description of Core Experiment 10: Combined and multi-hypothesis prediction", JVET-L1030-v3, 12 pages, 12$^{th}$ Meeting: Macao, CN, Oct. 3-12, 2018.

\* cited by examiner

LOW LATENCY LOCAL ILLUMINATION COMPENSATION

INCORPORATION BY REFERENCE

This is a continuation of U.S. application Ser. No. 16/525,533, filed Jul. 29, 2019, which claims the benefit of priority to U.S. Provisional Application No. 62/735,409, "LOW LATENCY LOCAL ILLUMINATION COMPENSATION" filed on Sep. 24, 2018, and U.S. Provisional Application No. 62/785,078, "LOCAL ILLUMINATION COMPENSATION DERIVATION AND SIGNALING" filed on Dec. 26, 2018, which are incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate) of, for example, 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may be predicted itself.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (105) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, advanced motion vector prediction (AMVP) mode and merge mode are described here.

In AMVP mode, motion information of spatial and temporal neighboring blocks of a current block can be used to predict motion information of the current block, while the prediction residue is further coded. Examples of spatial and temporal neighboring candidates are shown in FIG. 1C and FIG. 1D, respectively. A two-candidate motion vector predictor list is formed. The first candidate predictor is from the first available motion vector of the two blocks A0 (112), A1 (113) at the bottom-left corner of the current block (111), as shown in FIG. 1C. The second candidate predictor is from the first available motion vector of the three blocks B0 (114), B1 (115) and B2 (116) above the current block (111). If no valid motion vector can be found from the checked locations, no candidate will be filled in the list. If two available candidates have the same motion information, only one candidate will be kept in the list. If the list is not full, i.e., the list doesn't have two different candidates, a temporal co-located motion vector (after scaling) from C0 (122) at the bottom-right corner of the co-located block (121) will be used as another candidate, as shown in FIG. 1D. If motion information at C0 (122) location is not available, the center location C1 (123) of the co-located block will be used instead. In the above derivation, if there are still not enough motion vector predictor candidates, a zero motion vector will be used to fill up the list. Two flags mvp_l0_flag and mvp_l1_flag are signaled in the bitstream to indicate the AMVP index (0 or 1) for MV candidate list L0 and L1, respectively.

In HEVC, a merge mode for inter-picture prediction is introduced. If a merge flag (including a skip flag) is signaled as TRUE, a merge index is then signaled to indicate which candidate in a merge candidate list will be used to indicate the motion vectors of the current block. At the decoder, the merge candidate list is constructed based on spatial and temporal neighbors of the current block. As shown in FIG. 1C, up to four MVs derived from five spatial neighboring blocks (A0-B2) are added into the merge candidate list. In addition, as shown in FIG. 1D, up to one MV from two temporal co-located blocks (C0 and C1) is added to the list.

Additional merge candidates include combined bi-predictive candidates and zero motion vector candidates. Before taking the motion information of a block as a merge candidate, the redundancy checks are performed to check whether it is identical to an element in the current merge candidate list. If it is different from each element in the current merge candidate list, it will be added to the merge candidate list as a merge candidate. MaxMergeCandsNum is defined as the size of merge list in terms of candidate number. In HEVC, MaxMergeCandsNum is signaled in bitstream. A skip mode can be considered as a special merge mode with zero residual.

A standardization of next-generation video coding beyond HEVC is launched, i.e., the so-called versatile video coding (VVC). In VVC, a sub-block based temporal motion vector prediction (SbTMVP) method is proposed. Similar to the temporal motion vector prediction (TMVP) in HEVC, SbTMVP uses the motion field in the collocated picture to improve motion vector prediction and merge mode for CUs in the current picture. The same collocated picture used by TMVP is used for SbTVMP. SbTMVP differs from TMVP in the following two main aspects: (1) TMVP predicts motion at CU level but SbTMVP predicts motion at sub-CU level; and (2) whereas TMVP fetches the temporal motion vectors from the collocated block in the collocated picture (the collocated block is the bottom-right or center block relative to the current CU), SbTMVP applies a motion shift before fetching the temporal motion information from the collocated picture, where the motion shift is obtained from the motion vector from one of the spatial neighboring blocks of the current CU.

The SbTVMP process is illustrated in FIG. 1E and FIG. 1F. SbTMVP predicts the motion vectors of the sub-CUs within the current CU in two steps. In the first step, as shown in FIG. 1E, the spatial neighbors of a current block (131) are examined in the order of A1 (132), B1 (133), B0 (134) and A0 (135). Once the first available spatial neighboring block that has a motion vector that uses the collocated picture as its reference picture is identified, this motion vector is selected to be the motion shift to be applied. If no such motion vector is identified from the spatial neighbors, then the motion shift is set to (0, 0).

In the second step, the motion shift identified in Step 1 is applied (i.e., added to the coordinates of current block) to obtain sub-CU-level motion information (e.g., motion vectors and reference indices) from the collocated picture as shown in FIG. 1F. The example in FIG. 1F assumes the motion shift (149) is set to the motion vector of the spatial neighboring block A1 (143). Then, for a current sub-CU (e.g., sub-CU (144)) in the current block (142) of the current picture (141), the motion information of a corresponding collocated sub-CU (e.g., collocated sub-CU (154)) in the collocated block (152) of the collocated picture (151) is used to derive the motion information for the current sub-CU. The motion information of the corresponding collocated sub-CU (e.g., collocated sub-CU (154)) is converted to the motion vectors and reference indices of the current sub-CU (e.g., sub-CU (144)) in a similar way as the TMVP process in HEVC, where temporal motion scaling is applied to align the reference pictures of the temporal motion vectors to the reference picture of the current CU.

In VVC, a combined sub-block based merge list which contains both SbTVMP candidates and affine merge candidates is used in sub-block based merge mode. The SbTVMP mode is enabled/disabled by a sequence parameter set (SPS) flag. If the SbTMVP mode is enabled, the SbTMVP predictor is added as the first entry of the sub-block based merge list, and followed by the affine merge candidates. The maximum allowed size of the sub-block based merge list is 5 in some applications. The sub-CU size used in SbTMVP is fixed to be 8×8. As done for affine merge mode, SbTMVP mode is only applicable to a CU with both width and height are larger than or equal to 8.

The encoding logic of an additional SbTMVP merge candidate is the same as the encoding logic for other merge candidates, that is, for each CU in P or B slice, an additional rate distortion (RD) check is performed to decide whether to use the SbTMVP candidate.

In VVC, a history-based MVP (HMVP) method is proposed, where a HMVP candidate is defined as the motion information of a previously coded block. A table with multiple HMVP candidates is maintained during the encoding/decoding process. The table is emptied when a new slice is encountered. Whenever there is an inter-coded non-affine block, the associated motion information is added to the last entry of the table as a new HMVP candidate. The coding flow of the HMVP method is depicted in FIG. 1G.

The table size S is set to be 6, which indicates up to 6 HMVP candidates may be added to the table. When inserting a new motion candidate to the table, a constrained FIFO rule is utilized such that redundancy check is firstly applied to find whether there is an identical HMVP in the table. If found, the identical HMVP is removed from the table and all the HMVP candidates afterwards are moved forward, i.e., with indices reduced by 1. FIG. 1H shows an example of inserting a new motion candidate to the HMVP table.

HMVP candidates could be used in the merge candidate list construction process. The latest several HMVP candidates in the table are checked in order and inserted to the candidate list after the TMVP candidate. Pruning is applied on the HMVP candidates to the spatial or temporal merge candidate excluding sub-block motion candidate (i.e., ATMVP).

To reduce the number of pruning operations, the number of HMPV candidates to be check denoted by L is set as $L=(N<=4)?M:(8-N)$, where N indicates number of available non-sub-block merge candidates and M indicates number of available HMVP candidates in the table. In addition, once the total number of available merge candidates reaches the signaled maximally allowed merge candidates minus 1, the merge candidate list construction process from HMVP list is terminated. Moreover, the number of pairs for combined bi-predictive merge candidate derivation is reduced from 12 to 6.

HMVP candidates could also be used in the AMVP candidate list construction process. The motion vectors of the last K HMVP candidates in the table are inserted after the TMVP candidate. Only HMVP candidates with the same reference picture as the AMVP target reference picture are used to construct the AMVP candidate list. Pruning is applied on the HMVP candidates. In some applications, K is set to 4 while the AMVP list size is kept unchanged, i.e., equal to 2.

Pairwise average candidates are generated by averaging predefined pairs of candidates in the current merge candidate list. As mentioned above, in VVC, the number of pairwise average candidates is 6, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures. If only one motion vector is available, the one motion vector is directly used. If no motion vector is available, this list is considered as invalid. The pairwise average candidates replaces the combined candidates in HEVC standard.

Multi-hypothesis prediction is applied to improve uni-prediction of AMVP mode. One flag is signaled to enable or disable multi-hypothesis prediction. Moreover, one more merge index is signaled when the flag is true. In this way, multi-hypothesis prediction turns uni-prediction into bi-prediction, where one prediction is acquired using the original syntax elements in AMVP mode while the other prediction is acquired using the merge mode. The final prediction uses 1:1 weights to combine these two predictions as in bi-prediction. The merge candidate list is first derived from merge mode with sub-CU candidates (e.g., affine, alternative temporal motion vector prediction (ATMVP)) excluded. Next, the merge candidate list is separated into two individual lists, one for list 0 (L0) containing all L0 motions from the candidates, and the other for list 1 (L1) containing all L1 motions. After removing redundancy and filling vacancy, two merge lists are generated for L0 and L1, respectively. There are two constraints when applying multi-hypothesis prediction for improving AMVP mode. First, it is enabled for those CUs with the luma coding block (CB) area larger than or equal to 64. Second, it is only applied to L1 for low delay B pictures.

SUMMARY

Aspects of the disclosure provide methods and apparatuses for video encoding/decoding. In some examples, an apparatus for video decoding includes receiving circuitry and processing circuitry.

The processing circuitry decodes prediction information for a plurality of first blocks in a current coded picture that is a part of a coded video sequence. The prediction information indicates that the plurality of first blocks is coded in a local illumination compensation (LIC) mode. The processing circuitry selects a neighboring region for each of the plurality of first blocks. The selected neighboring region and the respective first block form a second block. Then the processing circuitry performs an inter prediction for the plurality of second blocks in parallel. The processing circuitry determines a set of LIC parameters for each of the plurality of first blocks based on the selected neighboring region of the respective first block. Based on the sets of LIC parameters, the processing circuitry reconstructs the plurality of first blocks.

In an embodiment, the selected neighboring region is at least one of a left neighboring region and an above neighboring region of the respective first block.

In an embodiment, the selected neighboring region and the respective first block have the same motion information.

According to embodiments of the disclosure, when one of the plurality of first blocks has a reference block, the processing circuitry selects a reference neighboring region of the reference block. The reference neighboring region of the reference block has a same shape and a same relative position as the selected neighboring region of the one of the plurality of first blocks. Based on the reference neighboring region of the reference block and the selected neighboring region of the one of the plurality of first blocks, the processing circuitry calculates the set of LIC parameters of the one of the plurality of first blocks.

According to embodiments of the disclosure, when one of the plurality of first blocks has a plurality of reference blocks, the processing circuitry selects a reference neighboring region for each of the plurality of reference blocks. The reference neighboring region of the respective reference block has a same shape and a same relative position as the selected neighboring region of the one of the plurality of first blocks.

In an embodiment, the processing circuitry calculates a weighted average of the reference neighboring regions of the plurality of reference blocks. Based on the weighted average of the reference neighboring regions and the selected neighboring region of the one of the plurality of first blocks, the processing circuitry calculates the set of LIC parameters.

In an embodiment, the processing circuitry calculates a set of LIC parameters for each of the plurality of reference blocks based on the reference neighboring region of the respective reference block and the selected neighboring region of the one of the plurality of first blocks. Then the processing circuitry calculates a prediction with LIC mode for each of the sets of LIC parameters based on the respective set of LIC parameters. The processing circuitry furthers calculates a weighted average of the predictions with LIC mode. Based the weighted average of the predictions with LIC mode, the processing circuitry reconstructs the one of the plurality of first blocks.

According to embodiments of the disclosure, the processing circuitry determines a boundary strength for a boundary separating two reconstructed adjacent blocks based on whether the two reconstructed adjacent blocks are coded in an LIC mode. Then the processing circuitry applies a deblocking filter to the boundary according to the boundary strength. In an embodiment, the boundary strength indicates one of a no filtering, a week filtering, and a strong filtering.

In an embodiment, when one of the two reconstructed adjacent blocks is determined to be coded in the LIC mode and the other one of the two reconstructed adjacent blocks is determined to be not coded in the LIC mode, the processing circuitry determines the boundary strength based on the LIC parameters of the LIC-coded block.

In an embodiment, when both of the two reconstructed adjacent blocks are determined to be coded in the LIC mode, the boundary strength is determined based on a difference between the LIC parameters of the two reconstructed adjacent blocks.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 2:
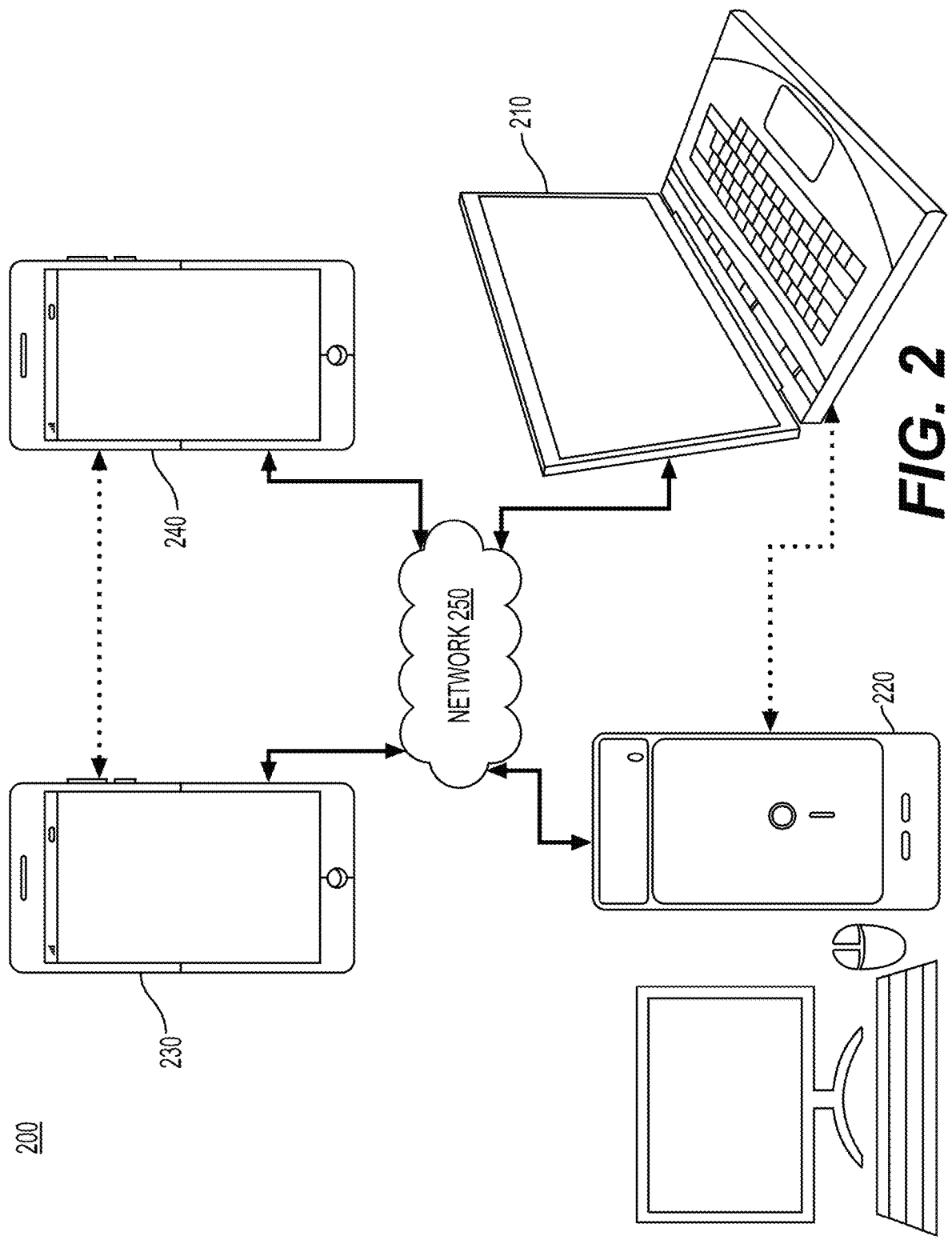
FIG. 2 is a schematic illustration of a simplified block diagram of a communication system in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
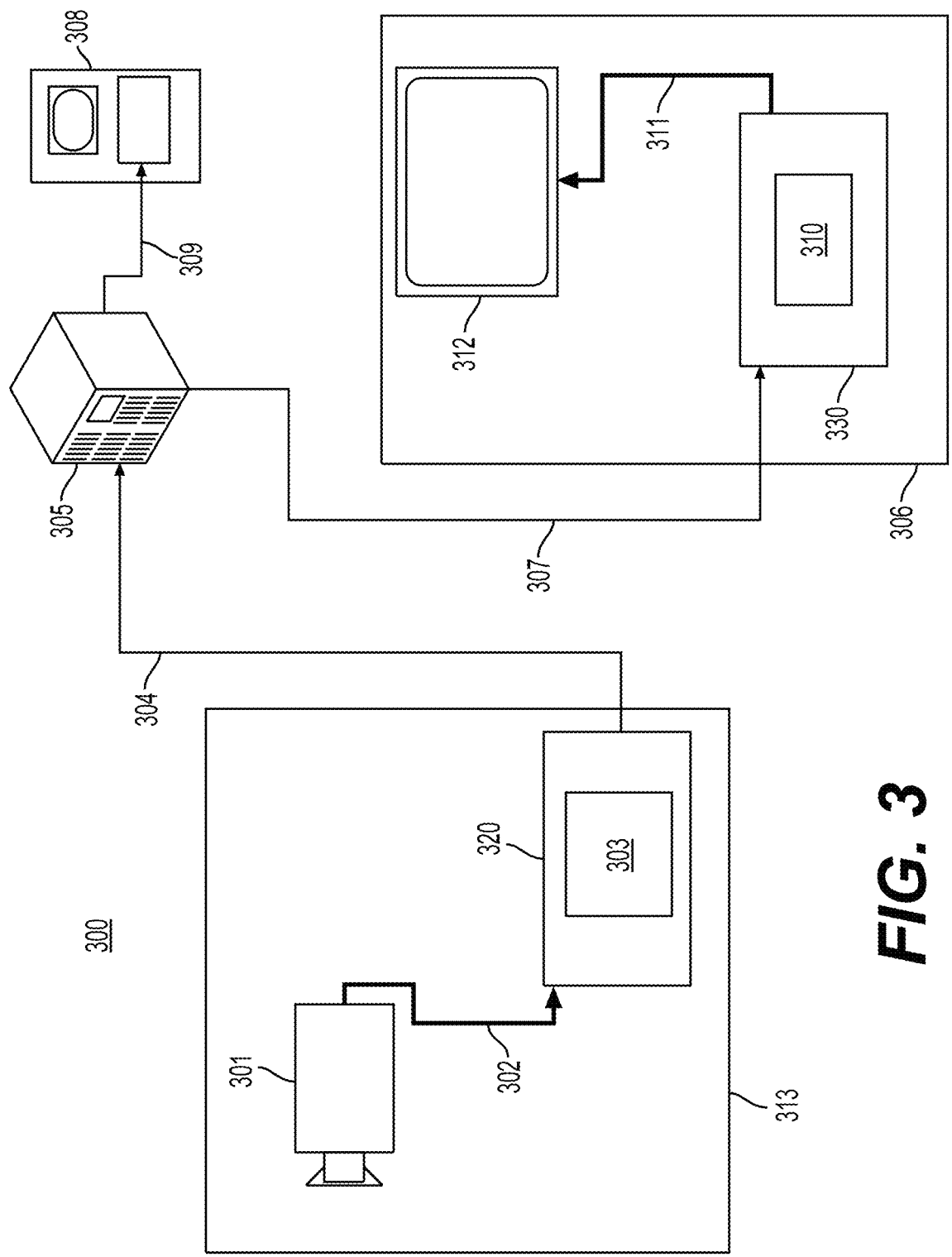
FIG. 3 is a schematic illustration of a simplified block diagram of a communication system in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick, and the like.

A streaming system may include a capture subsystem (313) that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
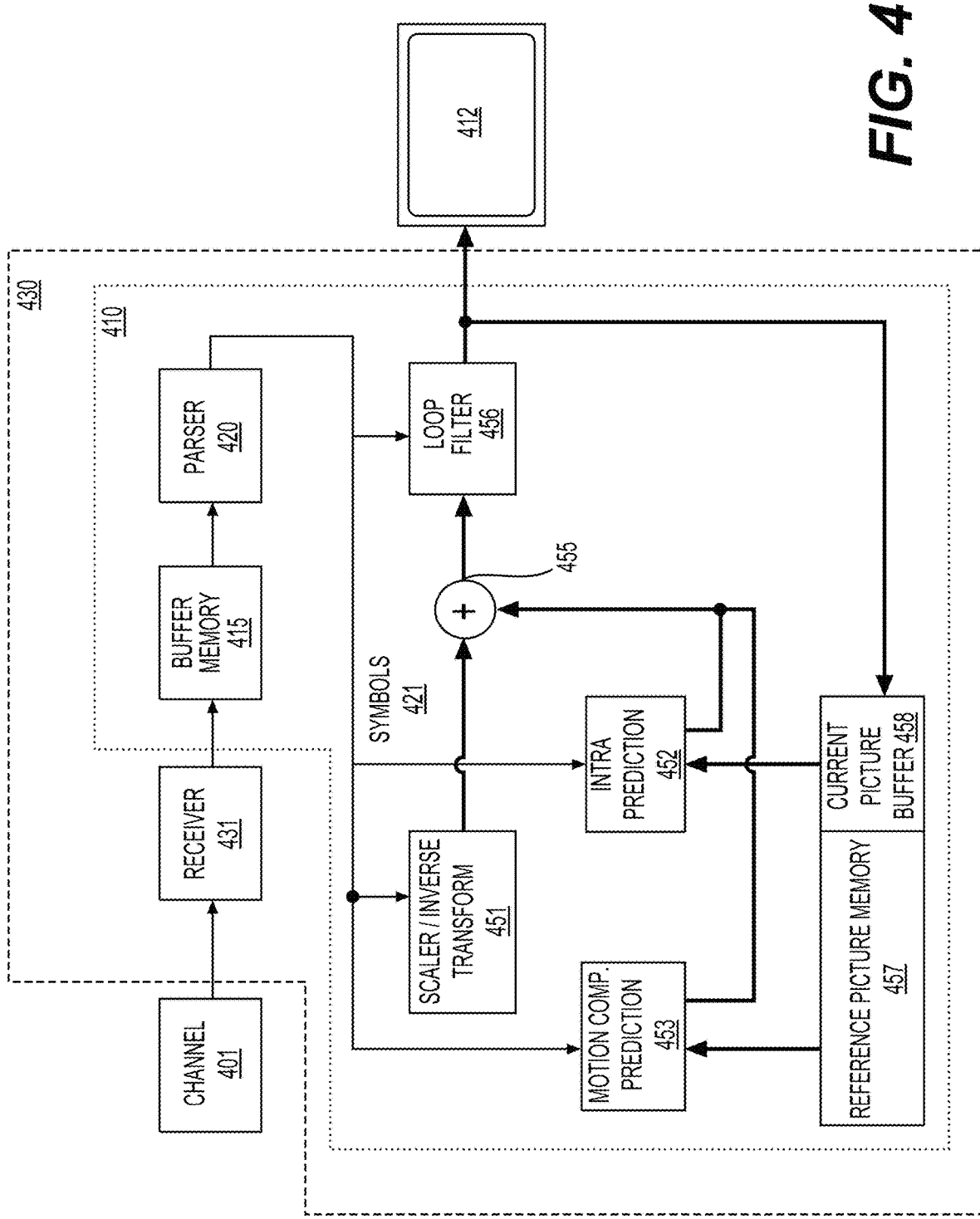
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information that the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
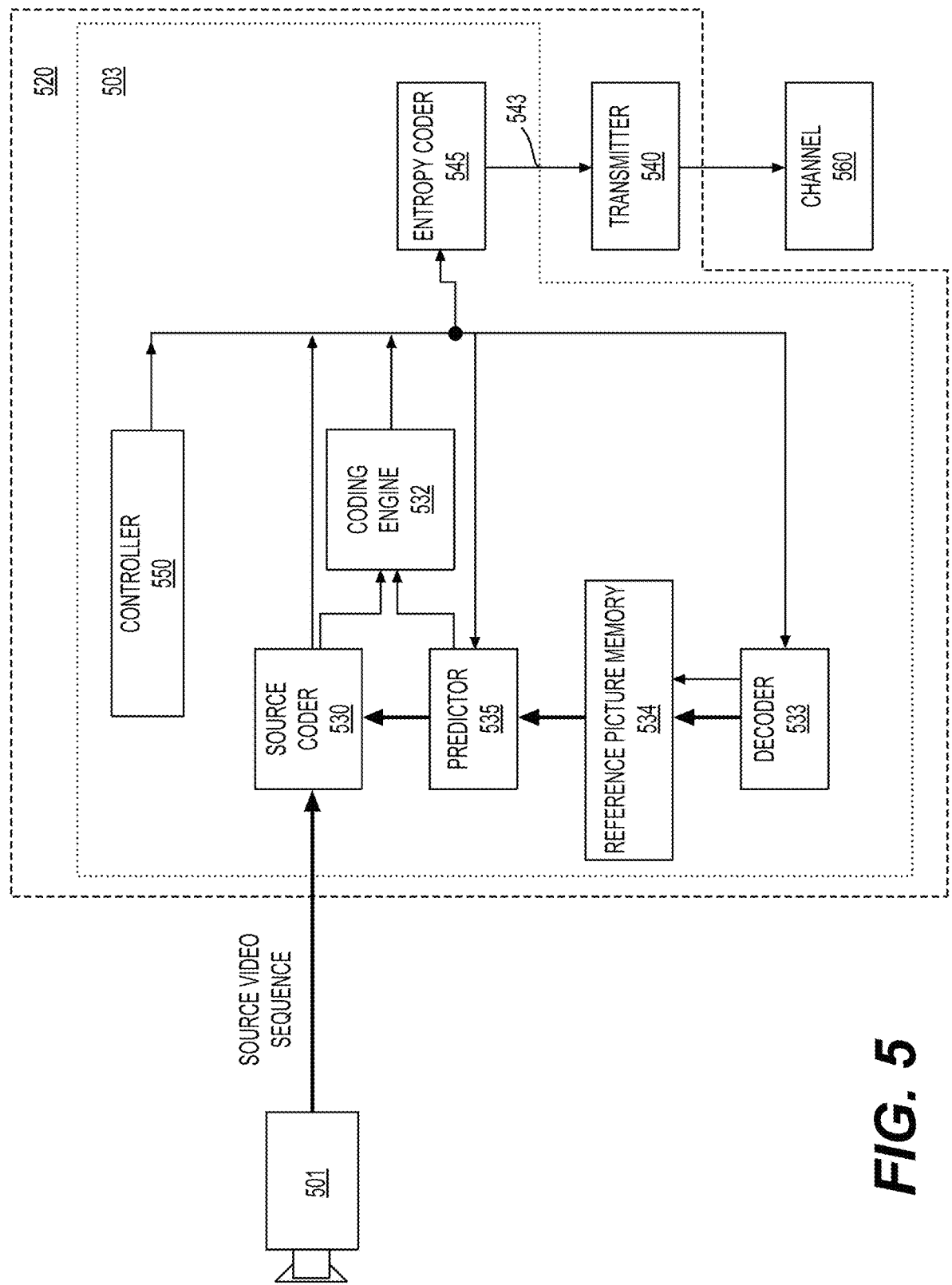
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415) and the parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quad-tree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
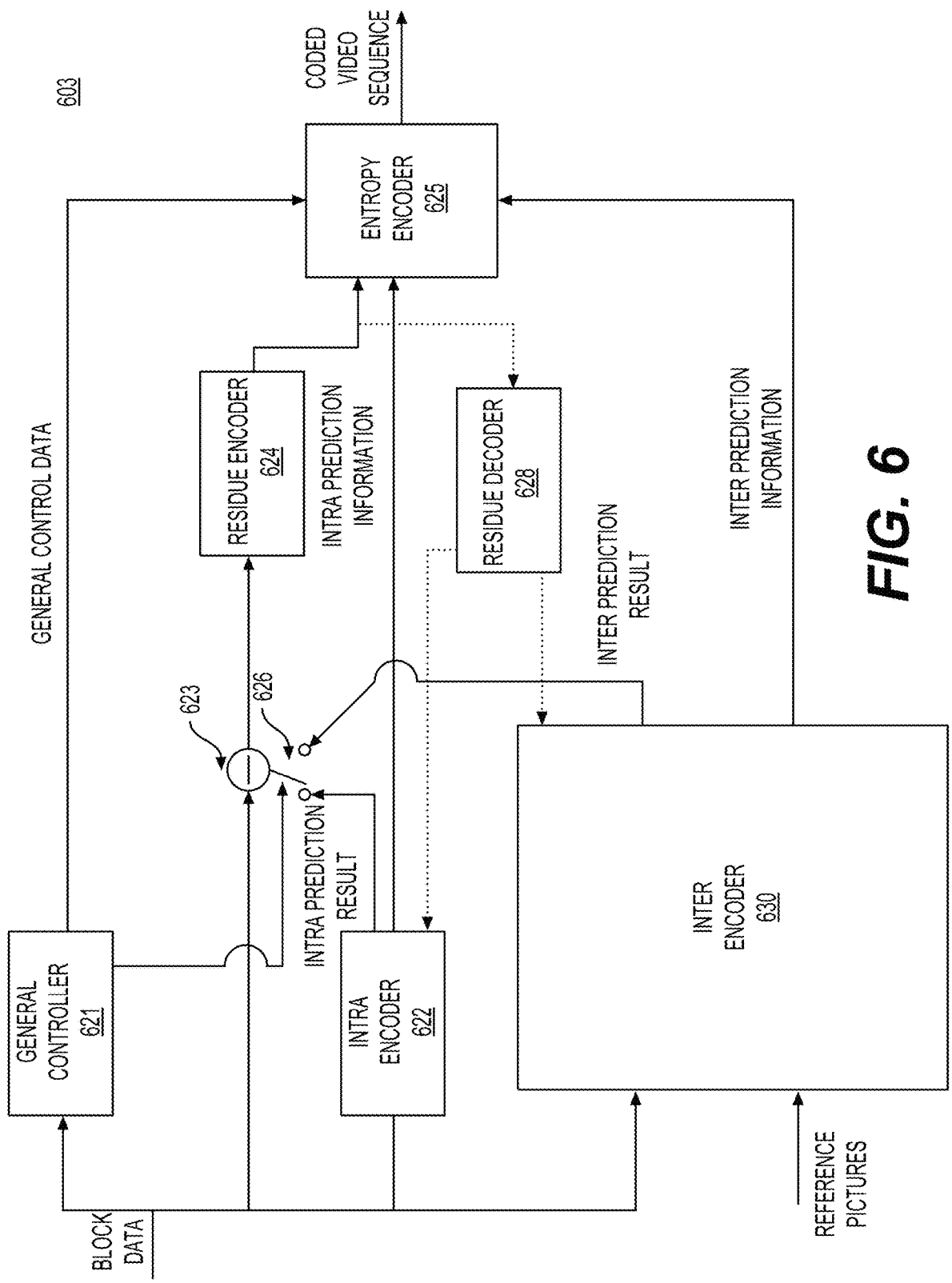
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
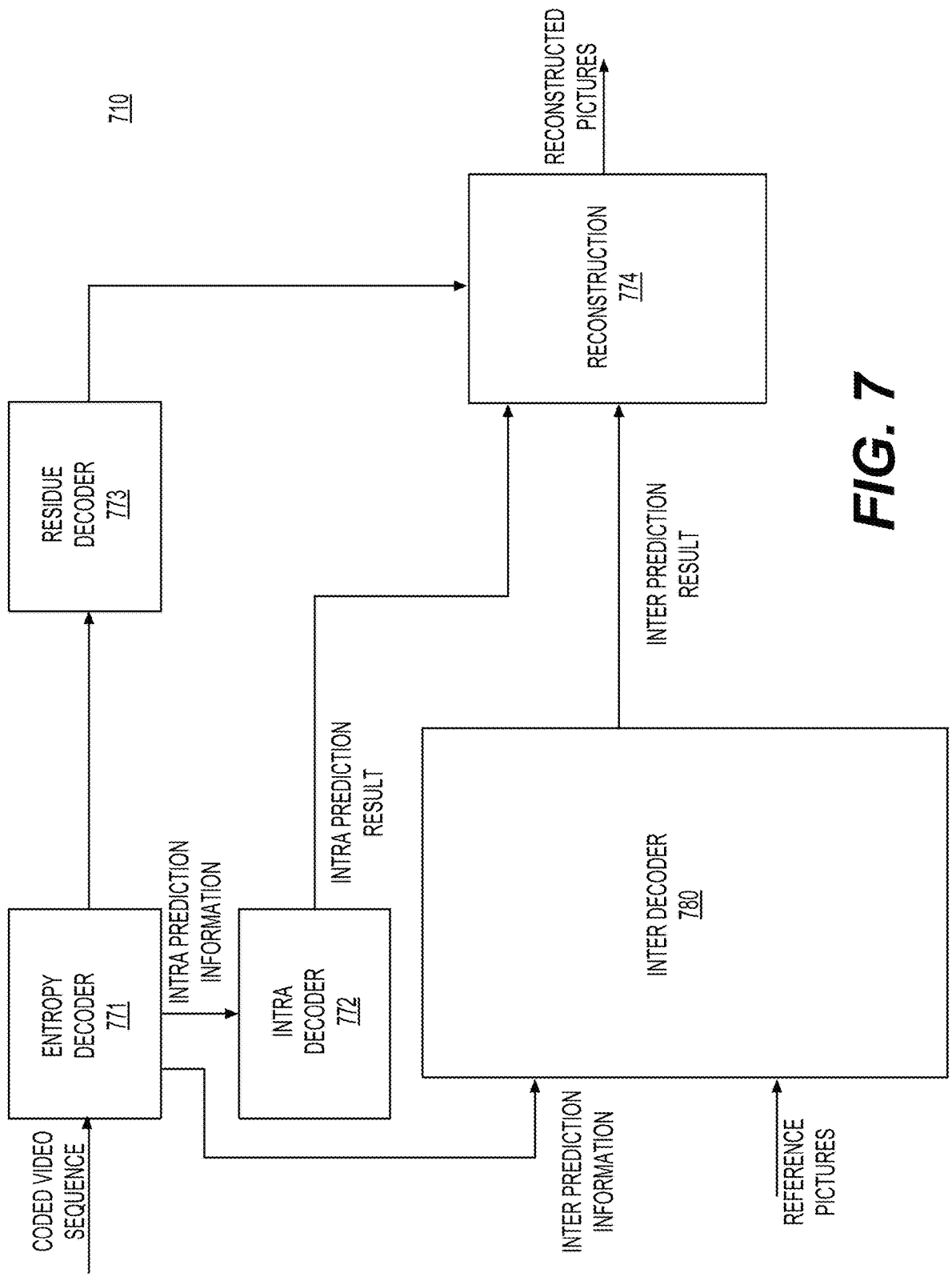
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

For an inter-coded block in a current picture, a reference block is from a reference picture, which may have different local illumination from the current picture due to various reasons. In one example, due to a lighting change (e.g., a scene of fireworks), the luminance changes at each picture, even at different levels for each block. In another example, for a moving object, the shading may change for only a few blocks along the trajectory of the moving object.

This disclosure presents various embodiments for local illumination compensation (LIC). For example, LIC can be applied in hybrid video coding technologies.

LIC is a block level coding. It may be switched ON/OFF at a coding unit (CU) level, for example by using an LIC flag. When a CU is coded in a merge/skip mode, an LIC flag of the CU can be copied from neighboring blocks of the CU. The copying can be performed in a manner similar to motion information copy in merge mode in one embodiment. In another embodiment (e.g., AMVP) the LIC flag is signaled for a CU to indicate whether an LIC mode is applied to the CU.

When an LIC mode is enabled for a picture, an additional CU level rate distortion (RD) check can be used to determine whether an LIC mode is applied to a CU. When the LIC mode is enabled for the CU, a mean-removed sum of absolute difference (MR-SAD) and a mean-removed sum of absolute Hadarmard-transformed difference (MR-SATD) can be used, instead of a sum of absolute difference (SAD) and a sum of absolute Hadarmard-transformed difference (SATD), for integer pel motion search and fractional pel motion search, respectively.

To reduce the encoding complexity, LIC may be disabled for an entire picture when an illumination change between a current picture and a reference picture of the current picture is below a threshold. For example, histograms of the current picture and every reference picture of the current picture are calculated at the encoder. If the histogram difference between the current picture and every reference picture of the current picture is below a given threshold, LIC is disabled for the current picture. Otherwise, LIC is enabled for the current picture.

According to aspects of this disclosure, when a current block is coded in an inter prediction mode and the LIC mode is enabled for the current block, the prediction with LIC mode (referred to as LIC-based prediction) is performed according to a linear model for illumination changes based on the inter prediction. As shown in Equation (1), $Pred_{LIC}$ represents predicted samples by LIC, Pred denotes predicted samples by using the inter prediction indicated by motion information of the current block, a is a scaling factor and b is an offset.

$$Pred_{LIC} = a \cdot Pred + b \qquad (1)$$

A final reconstruction of the prediction with LIC mode $Rec_{LIC}$ can be derived according to Equation (2), where Res is a residue (after dequantization and inverse transform) of the current block.

$$Rec_{LIC} = Pred_{LIC} + Res = a \cdot Pred + b + Res \qquad (2)$$

In an embodiment, to derive the LIC parameters a and b, a least squares error method is employed according to Equation (3). $Rec_{x,y}$ denotes a neighboring reconstructed sample of the current block, $Ref_{x',y'}$ denotes a corresponding sample in a reference block in the reference picture pointed to by a motion vector of the current block.

$$\{a, b\} = \operatorname{argmin} \left\{ \left(Rec_{x,y} - Ref_{x',y'}\right)^2 \right\} \qquad (3)$$

Figure 8:
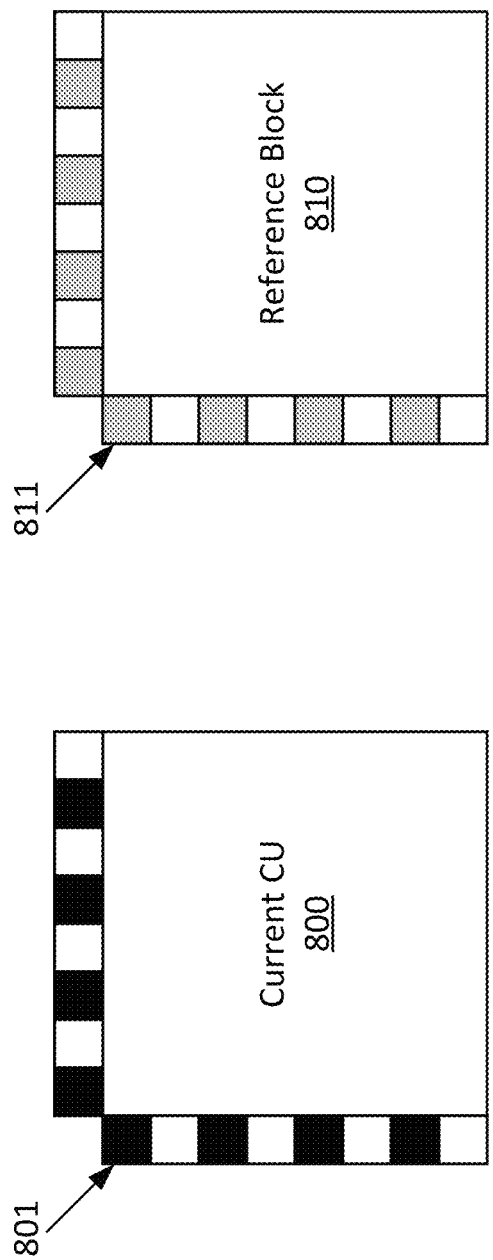
FIG. 8 shows neighboring samples used for deriving illumination compensation parameters according to an embodiment of the disclosure.

FIG. 8 shows neighboring samples used for deriving illumination compensation parameters according to an embodiment of the disclosure. In FIG. 8, a reference block (810) is indicated by motion information of a current block (800). The current block (800) is stored in an on-chip memory. The reference block (810) included in a reference picture is stored in either an on-chip memory or an off-chip memory, depending on a size of the reference picture. If the size of the reference picture is larger than an available storage space of the on-chip memory, the reference picture may be stored in an off-chip memory. When deriving the LIC parameters a and b, a plurality of subsampled (2:1 subsampling) neighboring samples (801) of the current block (800) are compared with a plurality of corresponding reference neighboring samples (811) of the reference block (810). It is noted that both the neighboring samples (801) and (811) are already reconstructed.

As described above, a prediction with LIC mode includes an inter prediction, a derivation of LIC parameters, and a final reconstruction. In the inter prediction, the reference picture can be accessed from the memory to read the reference block (810). In the derivation of LIC parameters, the reference picture can also be accessed from the memory to read the corresponding reference neighboring region (811). Therefore, the prediction with LIC mode may result in multiple accesses (e.g., two accesses) to the reference picture. When the memory is an off-chip memory, the multiple accesses may increase latency when LIC is used.

In a real-time video decoder, inter-coded blocks may be decoded in parallel as there is no dependency among the blocks after the motion vectors of the blocks are reconstructed. However, for a LIC-coded block (e.g., a block where LIC mode is enabled), the derivation of LIC parameters is based on reconstruction of the neighboring samples of the current block, which makes parallel decoding LIC-coded blocks more difficult. In view of this difficulty, LIC-coded blocks can be decoded in a serial mode (block by block). In other words, a current block can begin its own prediction with LIC mode after a prediction with LIC mode of a previous block is completed. This serial mode may also increase latency when LIC is used.

In order to reduce latency, a prediction with LIC mode can be performed in two steps. In the two-step illumination compensation method, the two steps are not necessarily conducted block by block. For example, multiple blocks coded in LIC mode may be processed in parallel in one step and each block coded in LIC mode may be processed serially in another step due to dependencies between the reconstructed samples.

Figure 9:
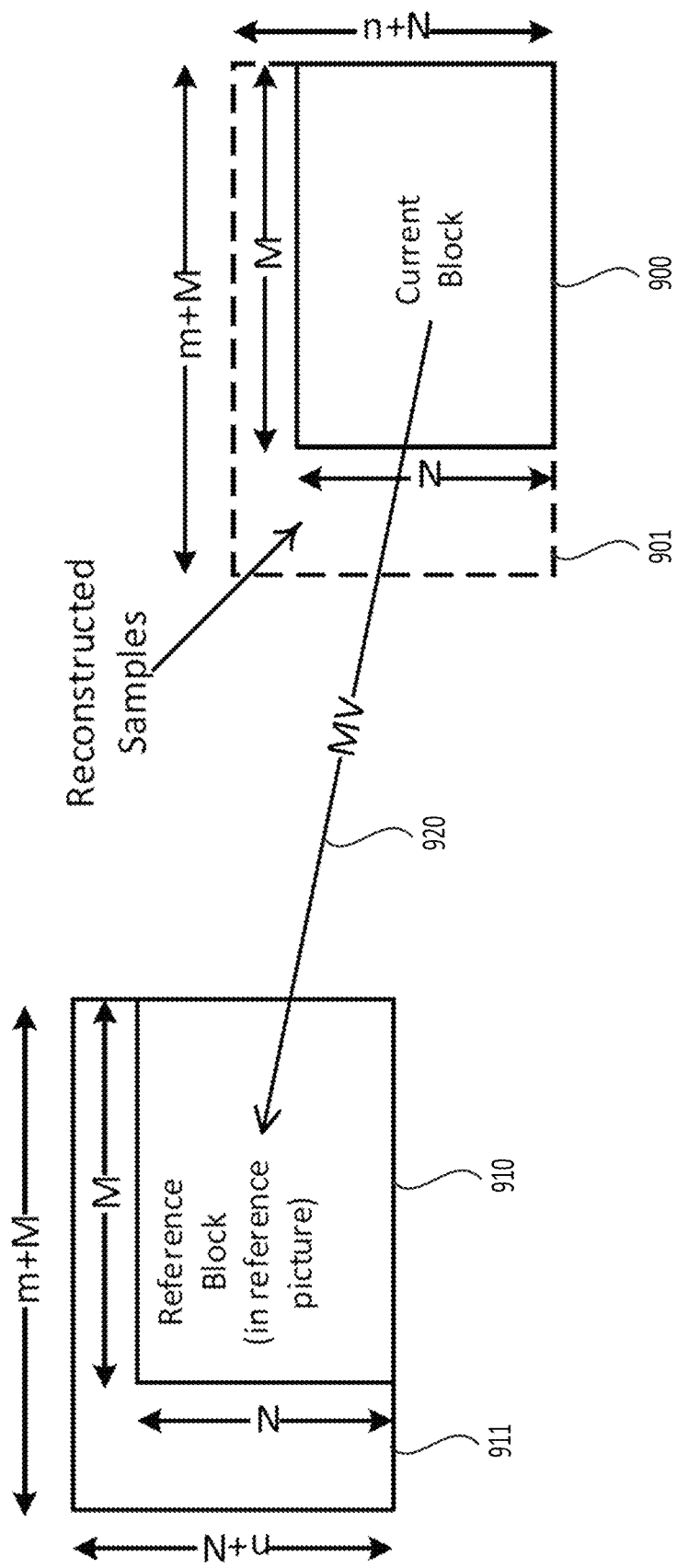
FIG. 9 shows a two-step illumination compensation method according to an embodiment of the disclosure.

FIG. 9 shows an example of the two-step illumination compensation method. In FIG. 9, a current block (900) with a size of M×N is to be decoded and its motion vector (920) points to a reference block (910) with the same size in a reference picture. In a first step of the two-step illumination compensation method, the current block (900) together with its neighboring region (901) is predicted by using an inter prediction mode. That is, instead of performing inter prediction on the M×N region, inter prediction is performed on a larger region (m+M)×(n+N), where m and n indicate m additional left columns and n additional top rows of the current M×N block (900), respectively. To perform inter prediction on the neighboring region (901), a reference neighboring region (911) of the reference block (910) can be accessed from a memory storing a reference picture including the reference neighboring region (911) and the reference block (910). Therefore, instead of accessing only the reference block (910), the two-step illumination compensation method can access both the reference block (910) and the reference neighboring region (911) to perform inter prediction on the current block (900) and its neighboring region (901).

The memory storing the reference picture including both the reference block (910) and the reference neighboring region (911) may be an on-chip memory or an off-chip memory. As described above, in some cases, the memory may need to be accessed twice: one access is to read the reference block (910) for the inter prediction and the other access is to read the reference neighboring region (911) for the derivation of the LIC parameters. When the memory is an off-chip memory, the two accesses may increase latency when LIC is used.

The two-step illumination compensation method can reduce latency by reducing the number of times the memory is accessed. For example, in the two-step illumination compensation method, the memory can only be accessed once instead of two times as described above. That is, by including both the current block (900) and its neighboring region (901) in the inter prediction, both the reference block (910) and the reference neighboring region (911) are accessed from the memory in the first step and then stored in the on-chip memory which can be easily accessed in the next step. Therefore, the latency when LIC is used can be reduced.

It is noted that the shape of the neighboring region (901) and the reference neighboring region (911) is used as an example and other shapes can be used in other embodiments. In an embodiment, m is zero, indicating no additional column is used in the neighboring region (901) and the reference neighboring region (911). In an embodiment, n is zero, indicating no additional row is used in the neighboring region (901) and the reference neighboring region (911). In an embodiment, a top-left m×n block in the (m+M)×(n+N) block is excluded from the prediction.

The first step of the two-step illumination compensation method is inter prediction. Since there is no dependency among the inter-coded blocks after the motion vectors are reconstructed, the inter-coded blocks can be predicted in parallel (or in a parallel mode), so that when LIC is applied to a current block, the inter prediction of the current block is already finished. The parallel decoding can thus reduce the latency when LIC is used.

In the second step of the two-step illumination compensation method, the derivation of the LIC parameters for each block in LIC mode is performed serially (or in a serial mode). Since the reference block (910) and the reference neighboring region (911) are already accessed from the off-chip memory and stored in the on-chip memory in the first step, it is not necessary to access the off-chip memory in the second step. In addition, for the current block (900), the inter prediction is already performed in the first step, so the LIC parameters can be derived based on the reconstructed neighboring region (901) and a final reconstruction can be conducted.

In an embodiment, the LIC parameter a is forced to be 1 and b is further derived from Eq. (3). Accordingly, the final reconstruction of LIC mode is as follows.

$$Rec_{LIC} = Pred_{LIC} + Res = Pred + b + Res = (Pred + Res) + b \quad (4)$$

As (Pred+Res) corresponds to motion compensation, the LIC can be motion compensation plus the offset b. In this case, the (Pred+Res) part may be put into the first step of the two-step illumination compensation method to be more aligned with an inter decoding process for blocks coded without LIC.

In an embodiment, for a bi-directional inter prediction, the LIC parameters may be derived for each reference list. For example, one set of LIC parameters $a_0$ and $b_0$ are derived for a reference list L0, and another set of LIC parameters $a_1$ and $b_1$ are derived for a reference list L1. After the derivation of the LIC parameters for each reference list, the LIC predictions $Pred_{LIC0}$ and $Pred_{LIC1}$ can be derived for the reference list L0 and L1, respectively, according to Eq. (1). The final prediction may be a weighted average of the LIC predictions $Pred_{LIC0}$ and $Pred_{LIC1}$.

In an embodiment, for a bi-directional inter prediction, the LIC parameters may be derived from final prediction, e.g., after a weighted average of two reference lists. For example, after the neighboring region is selected for each reference block, a weighted average of the neighboring regions of the reference blocks is derived. Then based on the weighted average of the neighboring regions of the reference blocks, the LIC parameters is derived according to Eq. (3) and the final LIC prediction is derived according to Eq. (2).

In an embodiment, LIC is not enabled for bi-directional inter prediction. For example, when bi-directional inter prediction is used, the LIC flag is not signaled and is inferred to be 0.

In an embodiment, LIC is enabled or only allowed when a block size and/or shape meets a certain condition. In an example, LIC is enabled or only allowed for a block when the block size is larger than a threshold. The threshold may be predefined, such as 32 luma samples. Further, the threshold may be signaled in a bitstream, such as a sequence parameter set (SPS), a picture parameter set (PPS), or a slice header. In another example, LIC is enabled or only allowed for a block when the block width is larger than a threshold. The threshold may be predefined, such as 8 luma samples. Further, the threshold may be signaled in the bitstream, such as the SPS, the PPS, or the slice header.

According to some embodiments of this disclosure, a deblocking filtering process can be performed on one or more boundaries. The deblocking filtering process can be performed for each CU in the same order as the decoding process. For example, the deblocking filtering process is performed by horizontal filtering vertical boundaries for an entire picture first, and then vertical filtering horizontal boundaries. In order to reduce computational complexity, the deblocking filtering process can be performed on 8×8 block boundaries instead of 4×4 block boundaries in some embodiments, for both luma and chroma components. Thus, complexity can be reduced by not processing the 4×4 block boundaries.

A boundary strength (BS) can be used to indicate a degree or strength of a deblocking filtering process that may be used for a boundary. In an embodiment, a value of 2 for BS indicates strong filtering, 1 indicates weak filtering, and 0 indicates no deblocking filtering.

In an embodiment, BS is calculated on a 4×4 sample grid basis, but can be re-mapped to an 8×8 sample grid. In an example, an 8×8 block includes four 4×4 blocks, so a boundary of the 8×8 block includes two sides of two adjacent 4×4 blocks. The BS of the boundary of the 8×8 block is determined by a maximum of two values of BS of the two sides of the two adjacent 4×4 blocks.

Figure 10:
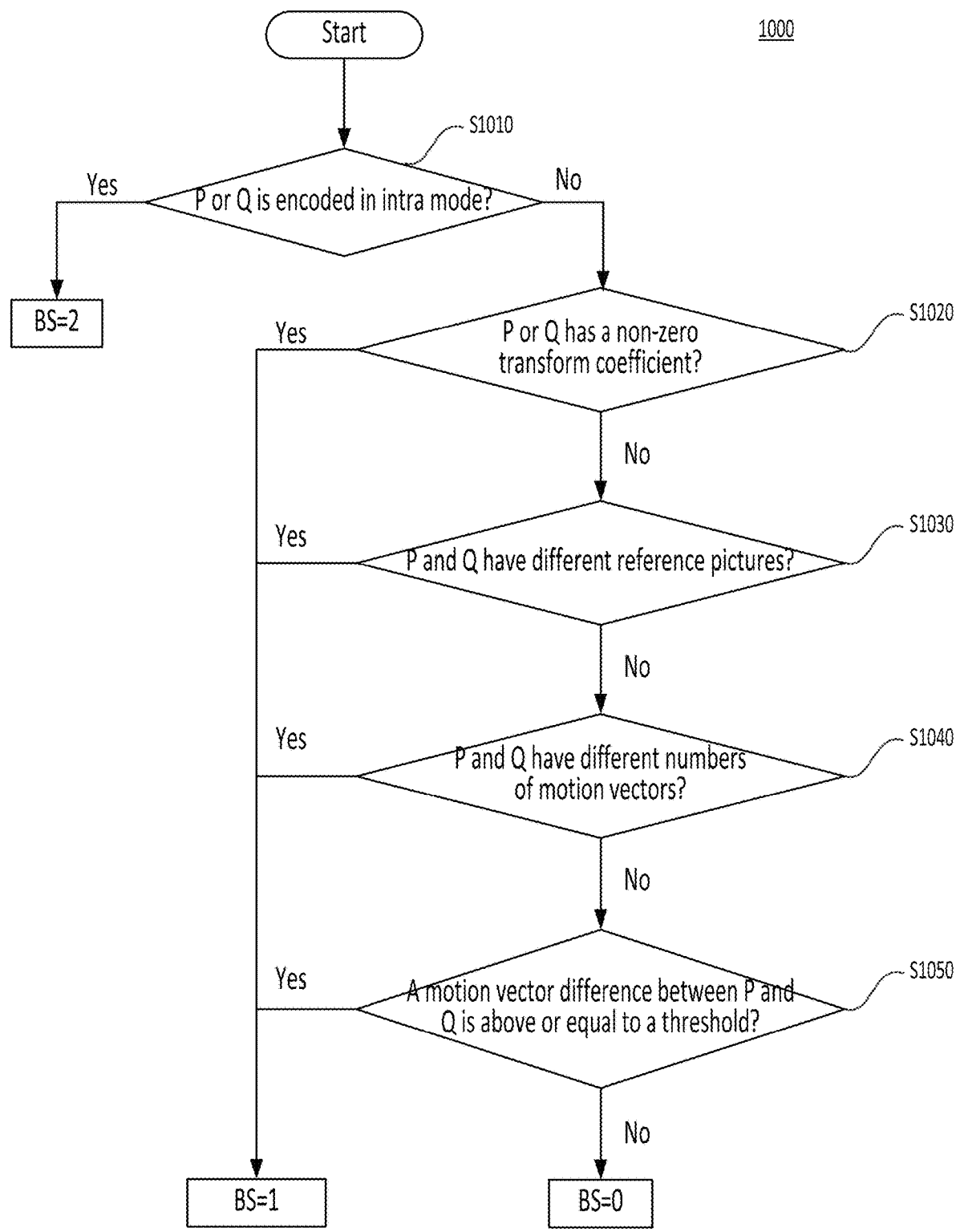
FIG. 10 shows a flowchart of a process for determining a boundary strength value according to an embodiment of the disclosure.

FIG. 10 shows a flowchart of a process (1000) for determining a BS value according to an embodiment of the disclosure. It is noted that the order of the steps in FIG. 10 can be reordered or one or more steps omitted in other embodiments.

In FIG. 10, P and Q are two adjacent blocks with a boundary there between. In a vertical boundary case, P can represent a block located to the left of the boundary and Q can represent a block located to the right of the boundary. In a horizontal boundary case, P can represent a block located above the boundary and Q can represent a block located below the boundary.

In FIG. 10, a BS value can be determined based on a prediction mode (e.g., intra coding mode), a non-zero transform coefficient (or existence of non-zero transform coefficients), a reference picture, a number of motion vectors, and a motion vector difference.

At step (S1010), the process (1000) determines whether P or Q is coded in an intra prediction mode. When at least one of P and Q is determined to be coded in the intra prediction mode, the process (1000) determines a first value (e.g., 2) for the BS. Otherwise, the process (1000) proceeds to step (S1020).

At step (S1020), the process (1000) determines whether P or Q has a non-zero transform coefficient. When at least one of P and Q is determined to have a non-zero transform coefficient, the process (1000) determines a second value (e.g., 1) for the BS. Otherwise, the process (1000) proceeds to step (S1030).

At step (S1030), the process (1000) determines whether P and Q have different reference pictures. When P and Q are determined to have different reference pictures, the process (1000) determines a third value (e.g., 1) for the BS. Otherwise, the process (1000) proceeds to step (S1040).

At step (S1040), the process (1000) determines whether P and Q have different numbers of motion vectors. When P and Q are determined to have different numbers of motion vectors, the process (1000) determines a fourth value (e.g., 1) for the BS. Otherwise, the process (1000) proceeds to step (S1050).

At step (S1050), the process (1000) determines whether a motion vector difference between P and Q is above or equal to a threshold T. When the motion vector difference between P and Q is determined to be above or equal to the threshold T, the process (1000) determines a fifth value (e.g., 1) for the BS. Otherwise, the process (1000) determines a sixth value (e.g., 0) for the BS. In an embodiment, the threshold T is set to 1 pixel. In the FIG. 10 example, the MV precision is ¼ pixel, so a value of the MV difference threshold can be set to 4. In another example, if the MV precision is 1/16, the value of the MV difference can be set to 16.

According to some embodiments of the disclosure, a BS value is determined based on LIC flags of two reconstructed adjacent blocks. Similar to the FIG. 10 example, the boundary strength (BS) may be set as 2 (e.g., strong filtering), 1 (e.g., weak filtering), or 0 (e.g., no filtering).

In an embodiment, when the LIC flags of the two reconstructed adjacent blocks are different, one of the two reconstructed adjacent blocks is determined to be coded in the LIC mode while the other one of the two reconstructed adjacent blocks is determined to be coded without the LIC mode. For example, an LIC flag ON indicates a block is coded in the LIC mode while an LIC flag OFF indicates a block is coded without the LIC mode. In such an embodiment, a weak filtering (e.g., BS=1) or no filtering (e.g., BS=0) can be applied to the boundary between the two reconstructed adjacent blocks.

In an embodiment, when the LIC flags of the two reconstructed adjacent blocks are different, a weak filtering (BS=1) is applied to the boundary between the two reconstructed adjacent blocks, regardless of whether the two reconstructed adjacent blocks have the same or different motion information.

Figure 11:
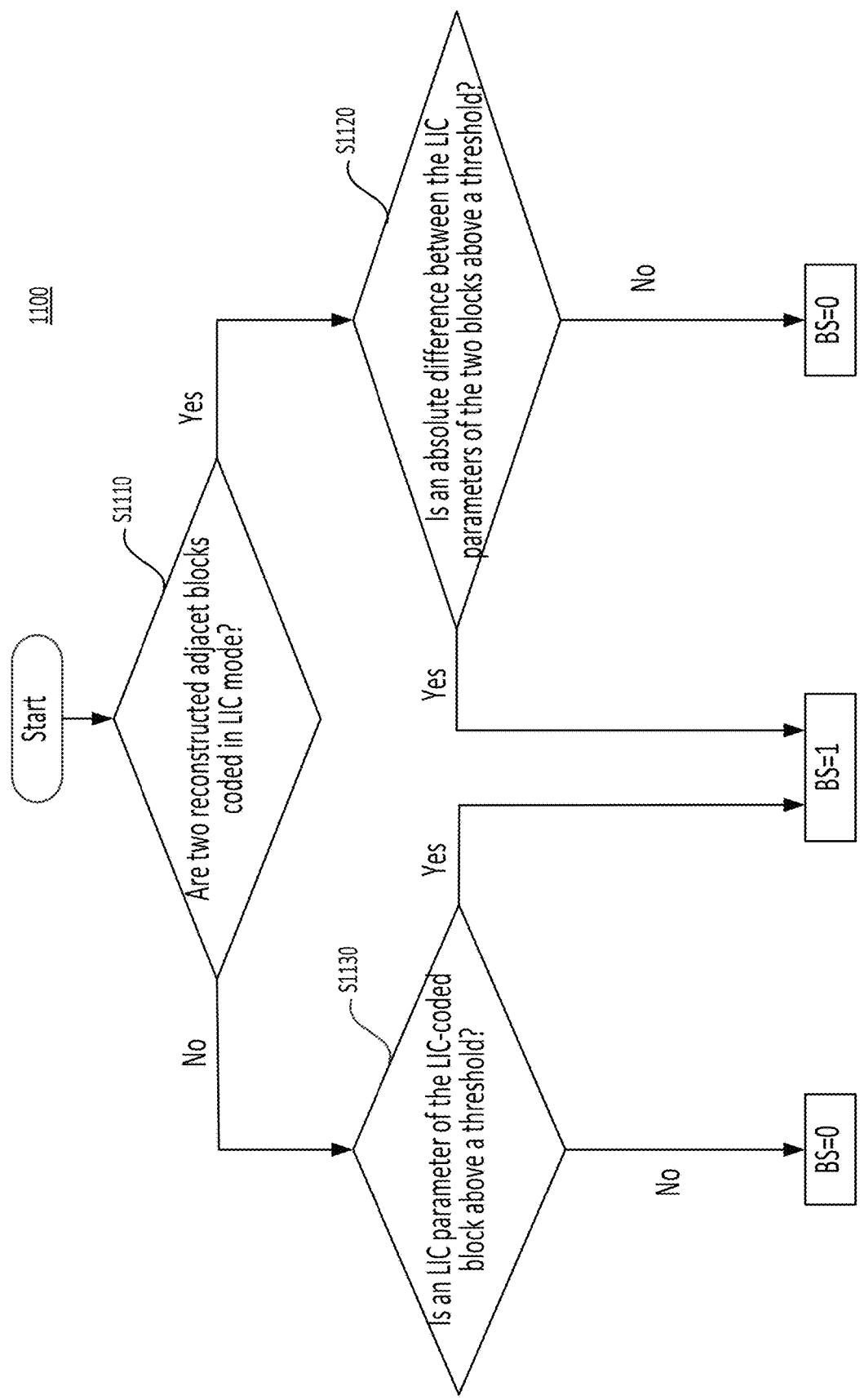
FIG. 11 shows a flowchart of a process for determining a boundary strength value according to an embodiment of the disclosure.

According to some embodiments of the disclosure, the BS value is determined based on one or more LIC parameters of the two reconstructed adjacent blocks. FIG. 11 shows a flowchart of a process (1100) for determining a BS value according to an embodiment of the disclosure.

At step (S1110), the process (1100) determines whether two reconstructed adjacent blocks, which are separated by a boundary to be deblocked, are coded in an LIC mode. When both blocks are determined to be coded in the LIC mode, the process (1100) proceeds to step (S1120). Otherwise, the process (1100) proceeds to step (S1130).

At step (S1120), the process (1100) determines whether an absolute difference between the LIC parameters of the two blocks is above a threshold.

In an embodiment, a weak filtering (e.g., BS=1) is applied to the boundary when an absolute difference of the offset b of the two blocks is above the threshold. Otherwise, no filtering (e.g., BS=0) is applied to the boundary. In this embodiment, the threshold may be set to be 0, or may depend on a bit depth of the reconstructed file (e.g., a RGB file or a YUV file).

In an embodiment, a weak filtering (BS=1) is applied to the boundary when an absolute difference of the scaling factor a of the two blocks is above the threshold. Otherwise, no filtering (e.g., BS=0) is applied to the boundary. In this embodiment, the threshold may be set to 8.

At step (S1130), the process (1100) determines whether an LIC parameter of the LIC-coded block is above a threshold.

In an embodiment, a weak filtering (BS=1) is applied to the boundary when the offset b of the LIC-coded block is above a threshold. Otherwise, no filtering (BS=0) is applied to the boundary.

In an embodiment, a weak filtering (BS=1) is applied to the boundary when the scaling factor a of the LIC-coded block is above a threshold. Otherwise, no filtering (BS=0) is applied to the boundary.

Figure 12:
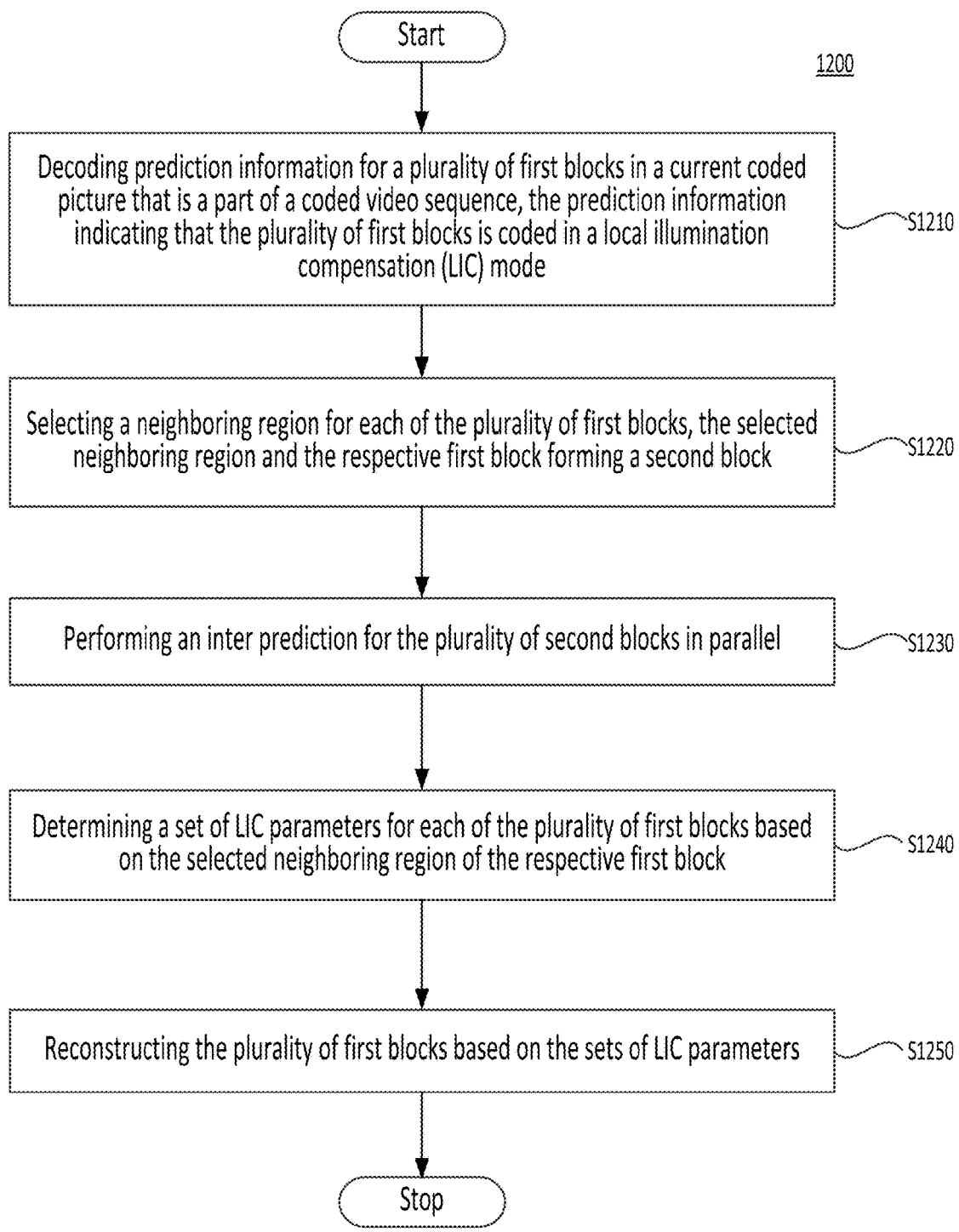
FIG. 12 shows a flow chart outlining an exemplary process according to an embodiment of the disclosure.

FIG. 12 shows a flow chart outlining an exemplary process (1200) according to an embodiment of the disclosure. The process (1200) can be used in the reconstruction of a block coded in LIC mode, so as to generate a prediction block for a block under reconstruction. In various embodiments, the process (1200) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the intra prediction module (452), the processing circuitry that performs functions of the video encoder (503), the processing circuitry that performs functions of the predictor (535), the processing circuitry that performs functions of the intra encoder (622), the processing circuitry that performs functions of the intra decoder (772), and the like. In some embodiments, the process (1200) is implemented in software instructions, thus when the processing circuitry executes the software instructions, the processing circuitry performs the process (1200).

The process (1200) may generally start at step (S1210), where the process (1200) decodes prediction information for a plurality of first blocks in a current coded picture that is a part of a coded video sequence. The prediction information indicates that the plurality of first blocks is coded in an LIC mode. After decoding the prediction information, the process (1200) proceeds to step (S1220).

At step (S1220), the process (1200) selects a neighboring region for each of the plurality of first blocks. The respective first block and the selected neighboring region of the respective first block form a second block. Therefore, a plurality of second blocks is obtained. The selected neighboring region is at least one of a left neighboring region and an above neighboring region of the respective first block. In addition, the selected neighboring region and the respective first block have the same motion information.

At step (S1230), the process (1200) performs an inter prediction for the plurality of second blocks in parallel. For a second block including a first block and a neighboring region of the first block, since the first block and the neighboring region of the first block have the same motion information, the second block will use the same motion information. Therefore, a reference block of the second block includes a reference block of the first block and a reference neighboring region of the reference block of the first block. The reference neighboring region of the reference block of the first block can be used to predict the neighboring region of the first block. The reference neighboring region of the reference block can have the same shape with the neighboring region of the first block. When performing the inter prediction for the second block, the reference block of the second block can be accessed from a memory.

In an embodiment, the reference block of the second block is stored in an off-chip memory. When performing the inter prediction for the second block, the reference block of the second block is accessed from the off-chip memory and then stored in an on-chip memory for subsequent access.

At step (S1240), the process (1200) determines a set of LIC parameters for each of the plurality of first blocks based on the selected neighboring region of the respective first block.

In an embodiment, when a first block has a reference block, the process (1200) selects a reference neighboring region of the reference block. The reference neighboring region of the reference block has a same shape and a same relative position as the selected neighboring region of the first block. Then the process (1200) calculates a set of LIC parameters for the first block based on the reference neighboring region of the reference block and the selected neighboring region of the first block.

In an embodiment, when a first block has a plurality of reference blocks, the process (1200) selects a reference neighboring region for each of the plurality of reference blocks. The reference neighboring region of the respective reference block has a same shape and a same relative position as the selected neighboring region of the first block. Then the process (1200) calculates a weighted average of the reference neighboring regions of the plurality of reference blocks. Based on the weighted average of the reference neighboring regions and the selected neighboring region of the first block, the process (1200) calculates a set of LIC parameters for the first block.

At step (1250), the process (1200) reconstructs the plurality of first blocks based on the sets of LIC parameters.

In an embodiment, when a first block has a plurality of reference blocks, the process (1200) selects a reference neighboring region for each of the plurality of reference blocks. The reference neighboring region of the respective reference block has a same shape and a same relative position as the selected neighboring region of the first block. Then the process (1200) calculates a set of LIC parameters for each of the plurality of reference blocks based on the reference neighboring region of the respective reference block and the selected neighboring region of the first block. Then the process (1200) calculates a prediction with LIC mode for each of the sets of LIC parameters based on the respective set of LIC parameters. Then the process (1200) calculates a weighted average of the predictions with LIC mode and reconstructs the first block according to the weighted average of the predictions with LIC mode.

After reconstructing the current block, the process (1200) terminates.

According to aspects of this disclosure, when an LIC flag is signaled for a CU to indicate whether an LIC mode is applied to the CU, such as in AMVP mode, the LIC flag may be stored in a buffer. In an example, for temporal prediction, the LIC flag may be stored in a temporal buffer. In another example, for spatial prediction, the LIC flag may be stored in a spatial buffer (e.g., line buffer in certain hardware codecs). Therefore, the buffer storing the LIC flag may have a non-negligible size in a memory. In addition, the buffer storing the LIC flag may be different from the buffer storing the current CTU, or the buffer storing the LIC flag may be in an off-chip memory, thus accessing the LIC flag may cause memory bandwidth issues and increase prediction latency.

According to embodiments of this disclosure, a decoding process of a video codec is modified such that an LIC flag (e.g., cu_lic_flag) signaling and derivation process of the video codec may not use a temporal buffer or a spatial buffer.

In an embodiment, when an MV candidate used for predicting a current CU that is coded in an inter prediction mode is a temporal predictor, the LIC flag of the current CU is inferred as OFF (e.g., cu_lic_flag=0) such that the LIC flag is not stored in a temporal buffer for prediction or inheritance.

In another embodiment, when an MV candidate used for predicting a current CU that is coded in an inter prediction mode is a spatial predictor, the LIC flag of the current CU depends on a CTU where the MV candidate is derived from.

Figure 1A:
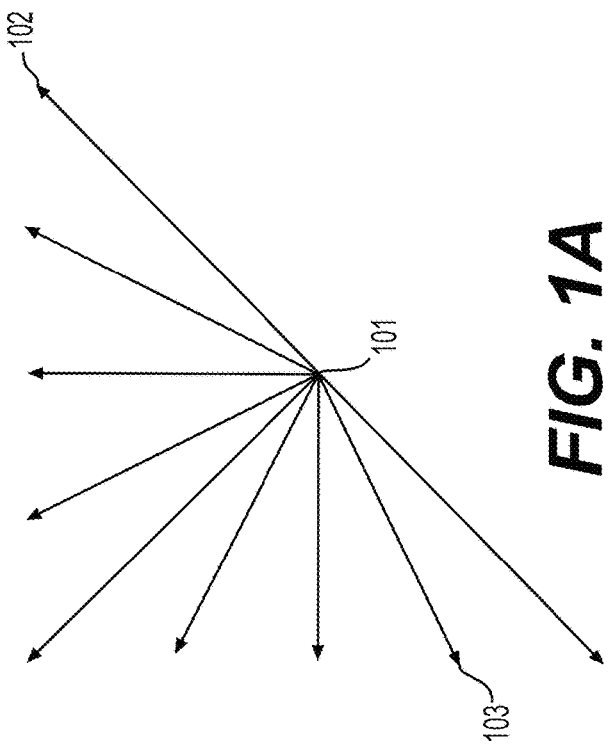
FIG. 1A is a schematic illustration of an exemplary subset of intra prediction modes.
Figure 1B:
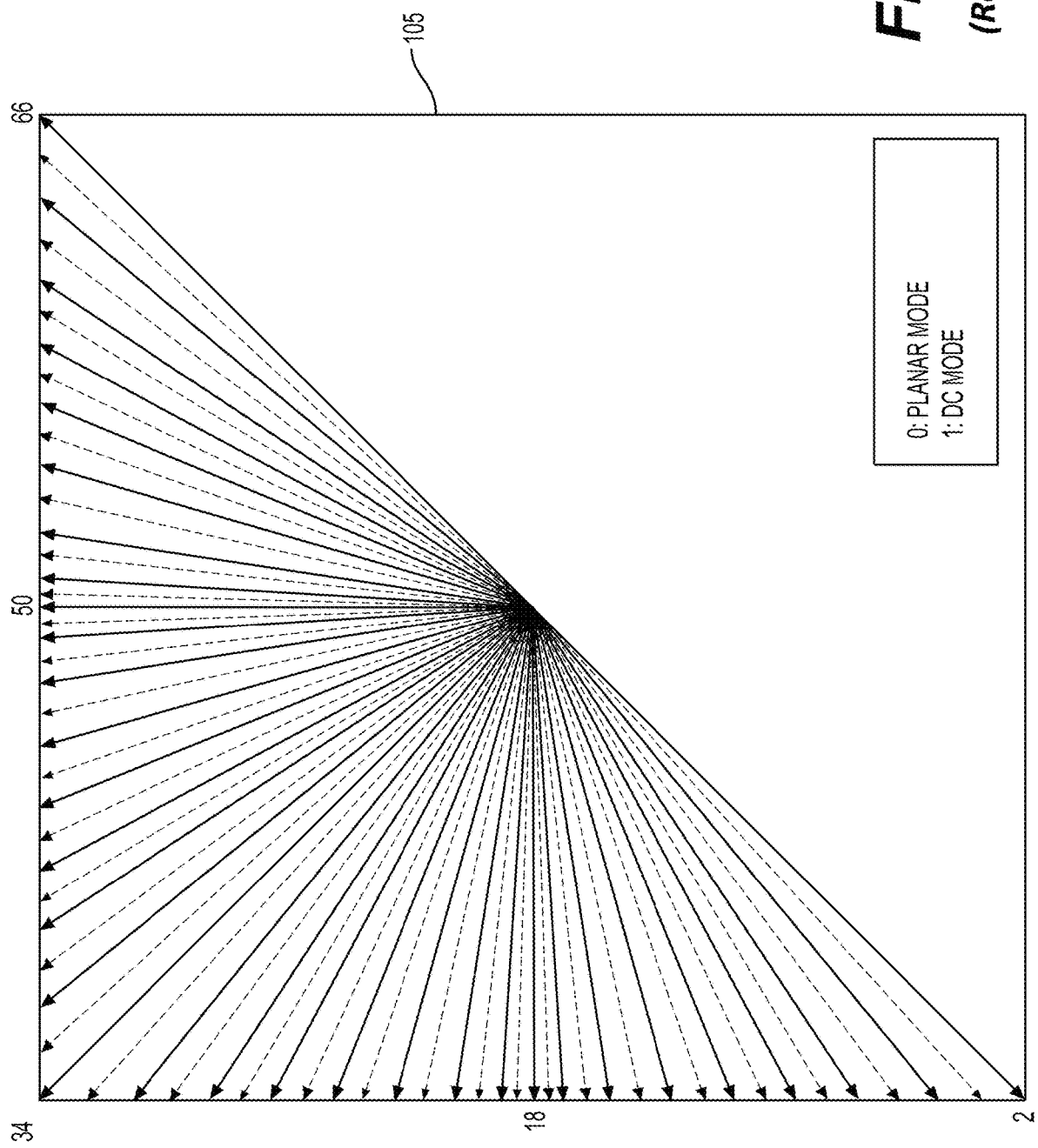
FIG. 1B is an illustration of exemplary intra prediction directions.
Figures 1C, 1D:
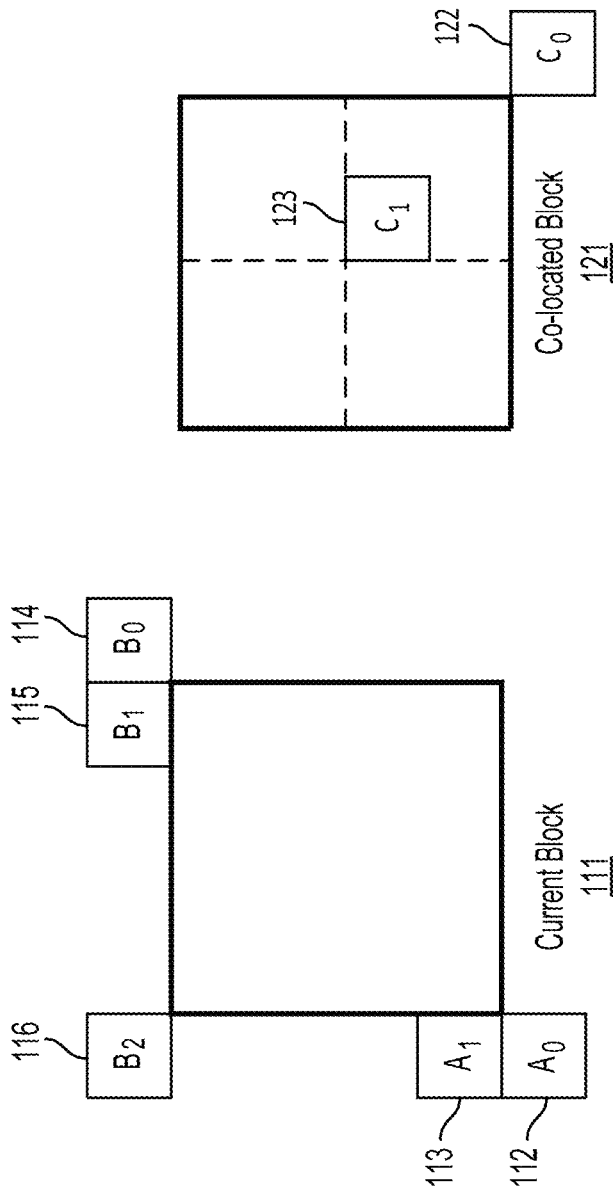
FIG. 1C is a schematic illustration of a current block and its surrounding spatial merge candidates in one example.
FIG. 1D is a schematic illustration of a co-located block and temporal merge candidates in one example.
Figure 1E:
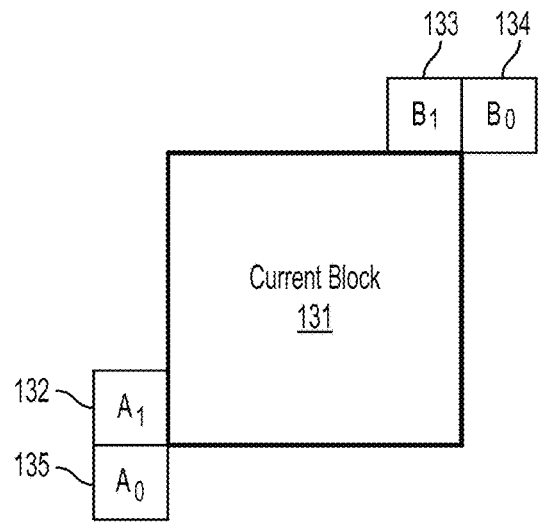
FIG. 1E is a schematic illustration of a current block and its surrounding spatial merge candidates for sub-block based temporal motion vector prediction (SbTMVP) according to one example.
Figure 1F:
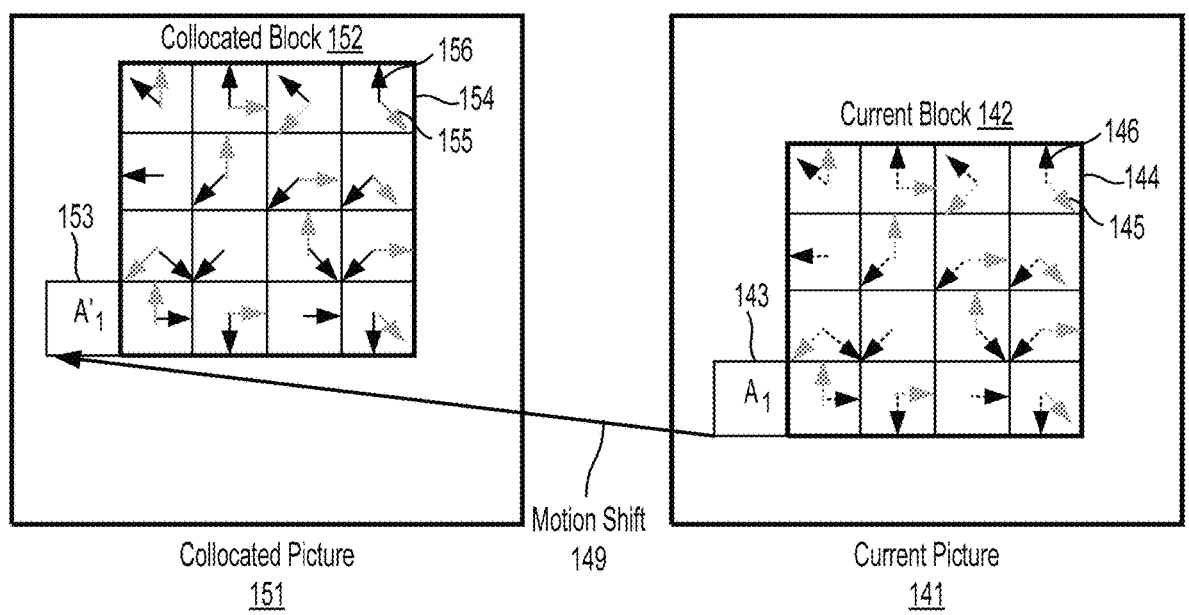
FIG. 1F is an exemplary process of deriving SbTMVP according to one example.
Figure 1G:
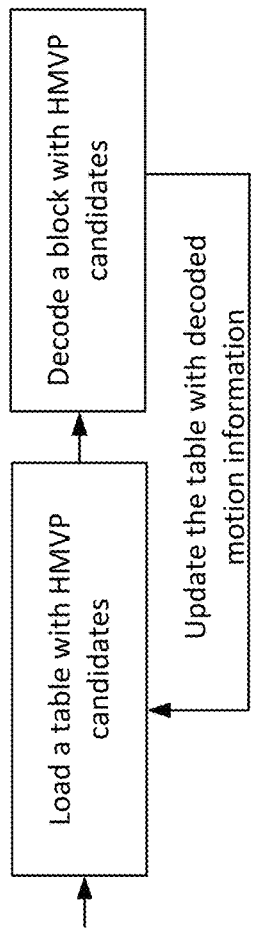
FIG. 1G is a decoding flow of a history based motion vector prediction (HMVP) method in one example.
Figure 1H:
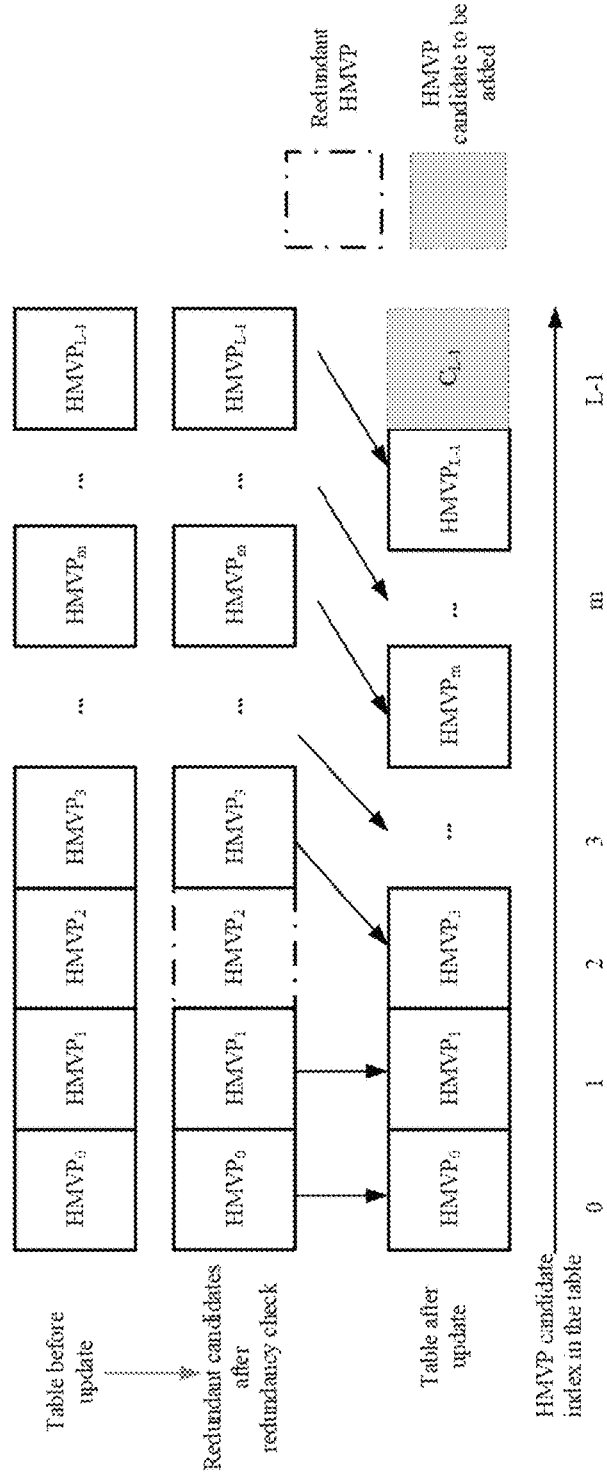
FIG. 1H is an exemplary process of updating a table in HMVP according to one example.

In an example, when the MV candidate is derived from a spatial neighboring CU of the current CU, and the spatial neighboring CU is located in a CTU that is different from the current CTU where the current CU is located, the LIC flag of the current CU is inferred as OFF. For example, for a current CU located in a corner position of a current CTU, e.g., in a top-left corner of the CTU, a spatial neighboring CU of the current CU, e.g., A0 (112) or B0 (114) as shown in FIG. 1C, may be located outside the current CTU and in a left neighboring CTU or a top neighboring CTU of the current CTU.

In another example, when the MV candidate is derived from a spatial neighboring CU of the current CU, and the spatial neighboring CU is located in a CTU that is in a different CTU row from the current CTU where the current CU is located, the LIC flag of the current CU is inferred as OFF. For example, for a current CU located in a top row of a current CTU, an above neighboring CU of the current CU, e.g., B0 (114) or B1 (115) as shown in FIG. 1, may be located in a top neighboring CTU of the current CTU and hence is in a different row from the current CTU.

In another example, when the MV candidate is derived from a spatial neighboring CU of the current CU, and the spatial neighboring CU is located in a slice or tile that is different from the current slice or the current tile where the current block is located, the LIC flag of the current CU is inferred as OFF.

According to embodiments of this disclosure, whether to signal or infer an LIC flag depends on a motion compensation mode. In an embodiment, the LIC flag is signaled for both a merge mode and a skip mode. In another embodiment, the LIC flag is signaled for a merge mode, but not signaled for a skip mode.

According to embodiments of this disclosure, each MV predictor in the MV predictor candidate list associates with a respective LIC flag. In an embodiment, when the MV difference is signaled or derived as zero for a current CU, the LIC flag of the current CU is not signaled but inferred from an MV predictor that is selected for predicting the MV of the current CU. That is, the respective LIC flag associated with the MV predictor is used as the LIC flag of the current CU.

According to embodiments of this disclosure, when an MV candidate of a current CU is derived from more than one MV predictor, the LIC flag of the current CU is inferred as OFF in an embodiment, or is inferred as ON in another embodiment, or depends on an LIC flag associated with one of the more than one MV predictor.

In an embodiment, when an MV of a current CU is derived from more than one MV predictor and at least one LIC flag associated with any of the more than one MV predictor is OFF, the LIC flag of the current CU is inferred as OFF. Otherwise, the LIC flag of the current CU is inferred as ON.

In another embodiment, when an MV of a current CU is derived from more than one MV predictor and at least one LIC flag associated with any of the more than one MV predictor is not OFF, the LIC flag of the current CU is inferred as ON. Otherwise, the LIC flag of the current CU is inferred as OFF.

According to embodiments of this disclosure, before signaling the LIC flag, a flag (e.g., cu_lic_present_flag) for a merge candidate is inferred in a similar way as the LIC flag in the forgoing embodiments. If the flag (e.g., cu_lic_present_flag) is inferred as ON, the LIC flag is signaled, which may be OFF or ON. Otherwise, the LIC flag is not signaled but inferred as OFF.

For deblocking process, if the LIC flag of a block is not available, such as in the case that the block is outside the current CTU and the LIC flag is not buffered for blocks outside the current CTU, the LIC flag is inferred as OFF.

Generalized bi-prediction (GBi) can be considered as a special case of multi-bi-prediction hypothesis prediction, in which the number of motion hypothesis is limited to 2. With GBi, the bi-prediction $P_{bi\text{-}pred}$ is generated using Eq. (5) with one weighting parameter signaled for the coded CU, where P0 and P1 are motion compensated predictions using reference picture in list-0 and list-1, respectively, and w is a weighting parameter for list-1 prediction represented in ⅛ precision.

$$P_{bi\text{-}pred} = ((8-w)*P_0 + w*P_1 + 4) \gg 3 \qquad (5)$$

In current GBi design, there are 5 weights {−2/8, 3/8, 4/8, 5/8, 10/8} available for low-delay picture and 3 weights {3/8, 4/8, 5/8} for non-low-delay picture. In inter prediction mode, if bi-prediction is used and the CU area is smaller than 128 luma samples, GBi is disabled without any signaling. It is noted that LIC and GBi may be used simultaneously, but the additionally introduced complexity by using them both cannot be justified by the coding benefit.

According to embodiments of the disclosure, when LIC is on, the usage of GBi process is constrained to reduce complexity. In one embodiment, GBi and LIC are not used simultaneously. When LIC is ON, regardless of whether the LIC flag is inferred or signaled, GBi is not signaled but inferred as OFF and the default 1:1 weighting is used.

In another embodiment, GBi and LIC may be simultaneously used only when a block has no explicitly signaled GBi and LIC information, such as merge/skip mode where GBi and LIC are both inferred.

The techniques described above, can be implemented as computer software using computer-readable instructions and physically stored in one or more computer-readable media. For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
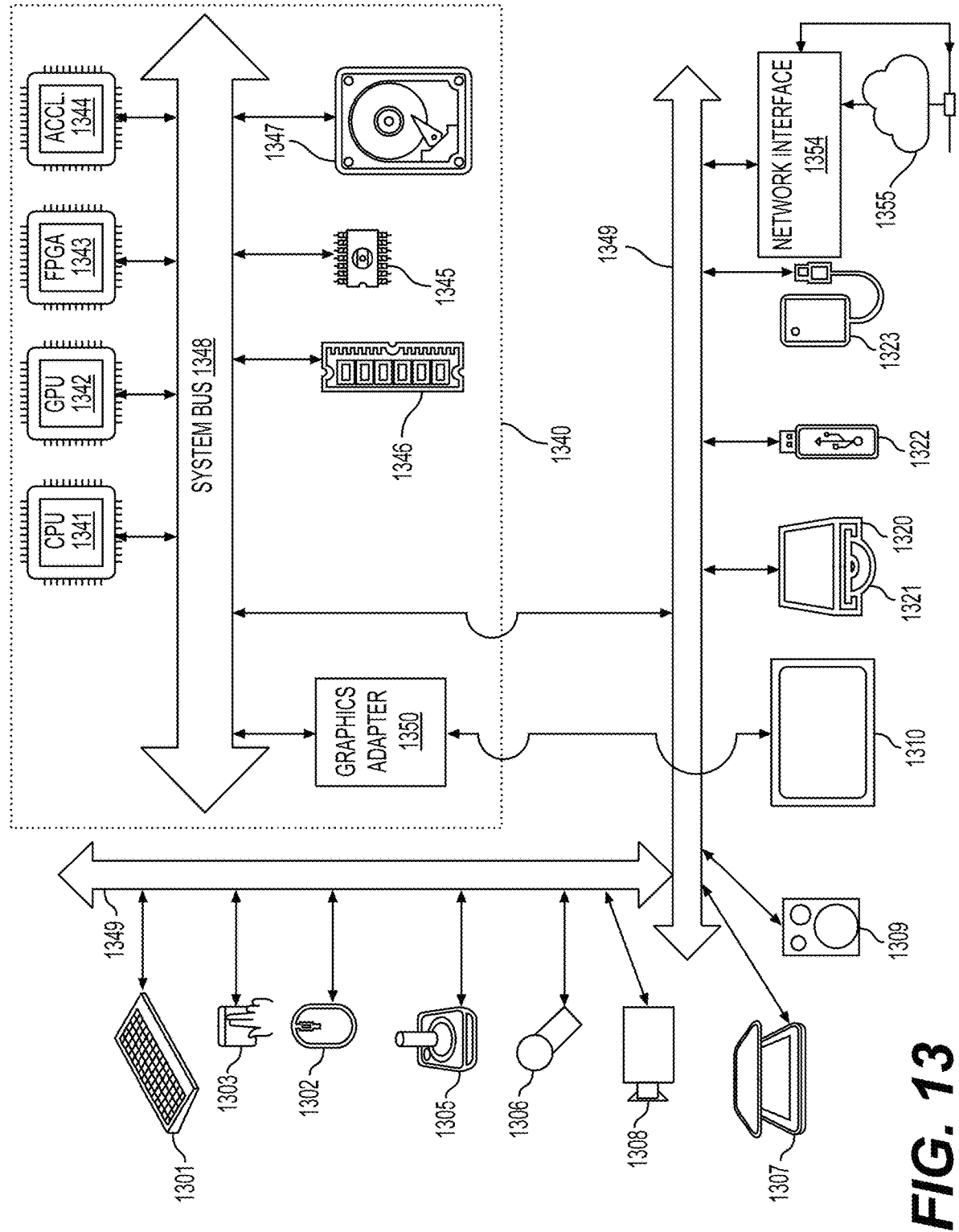
FIG. 13 is a schematic illustration of a computer system in accordance with an embodiment.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can be also be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hardwired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

APPENDIX A: ACRONYMS

AMVP: Advanced Motion Vector Prediction
ASIC: Application-Specific Integrated Circuit
BMS: Benchmark Set
BS: Boundary Strength
BV: Block Vector
CANBus: Controller Area Network Bus
CD: Compact Disc
CPR: Current Picture Referencing
CPUs: Central Processing Units
CRT: Cathode Ray Tube
CTBs: Coding Tree Blocks
CTUs: Coding Tree Units
CU: Coding Unit
DPB: Decoder Picture Buffer
DVD: Digital Video Disc
FPGA: Field Programmable Gate Areas
GOPs: Groups of Pictures
GPUs: Graphics Processing Units
GSM: Global System for Mobile communications
HDR: High Dynamic Range
HEVC: High Efficiency Video Coding
HRD: Hypothetical Reference Decoder
IBC: Intra Block Copy
IC: Integrated Circuit
JEM: Joint Exploration Model
LAN: Local Area Network
LCD: Liquid-Crystal Display
LIC: Local Illumination Compensation
LTE: Long-Term Evolution
MR-SAD: Mean-Removed Sum of Absolute Difference
MR-SATD: Mean-Removed Sum of Absolute Hadamard-Transformed Difference
MV: Motion Vector
OLED: Organic Light-Emitting Diode
PBs: Prediction Blocks
PCI: Peripheral Component Interconnect
PLD: Programmable Logic Device
PPS: Picture Parameter Set
PUs: Prediction Units
RAM: Random Access Memory
ROM: Read-Only Memory
SCC: Screen Content Coding SDR: Standard Dynamic Range
SEI: Supplementary Enhancement Information
SNR: Signal Noise Ratio
SPS: Sequence Parameter Set
SSD: Solid-state Drive
TUs: Transform Units
USB: Universal Serial Bus
VUI: Video Usability Information
VVC: Versatile Video Coding

What is claimed is:

1. A method for video coding in a decoder, the method comprising:
in response to a determination that a motion vector predictor of a current block is a temporal predictor,
determining that the current block is not coded in a local illumination compensation (LIC) mode,
inferring an LIC flag of the current block as OFF such that the LIC flag is not stored in a temporal buffer of the decoder, and
performing an inter prediction for the current block;
in response to a determination that the motion vector predictor for the current block is a spatial predictor,
determining that the current block is coded in the LIC mode based on an LIC flag associated with the motion vector predictor for the current block,
determining a set of LIC parameters for the current block, and
reconstructing the current block based on the set of LIC parameters.

2. The method of claim 1, wherein the LIC flag indicates whether the current block is or is not coded in the LIC mode.

3. The method of claim 1, wherein, in response to the determination that the motion vector predictor of the current block is the spatial predictor, the determining that the current block is coded in the LIC mode is based on a coding tree unit (CTU) from which the spatial predictor is derived.

4. The method of claim 3, wherein the LIC flag indicates whether the current block is or is not coded in the LIC mode and the LIC flag is not stored in a spatial buffer.

5. The method of claim 3, wherein, in response to a determination that the motion vector predictor is derived from a spatial neighboring block of the current block and the spatial neighboring block is located in a CTU that is different from a CTU where the current block is located, the current block is determined not to be coded in the LIC mode.

6. The method of claim 3, wherein, in response to a determination that the motion vector predictor is derived from a spatial neighboring block of the current block and the spatial neighboring block is located in a CTU in a different row from a CTU where the current block is located, the current block is determined not to be coded in the LIC mode.

7. The method of claim 1, wherein, in response to a determination that the motion vector predictor is derived from a spatial neighboring block of the current block and the spatial neighboring block is located in a slice or tile that is different from a slice or tile where the current block is located, the current block is determined not to be coded in the LIC mode.

8. The method of claim 1, wherein the determining that the current block is coded in the LIC mode based on the LIC flag is performed in both a merge mode and a skip mode.

9. The method of claim 1, wherein the determining that the current block is coded in the LIC mode based on the LIC flag is performed in a merge mode but not in a skip mode.

10. The method of claim 1, wherein
each motion vector predictor candidate of the current block is associated with a respective LIC flag, and
when a motion vector difference of the current block is zero, the determining that the current block is coded in the LIC mode is based on an LIC flag associated with a motion vector predictor candidate that is selected for predicting a motion vector of the current block.

11. The method of claim 1, wherein, in response to a determination that a motion vector of the current block is derived from more than one motion vector predictor, the method further comprises determining that the current block is coded in the LIC mode.

12. The method of claim 1, wherein, in response to a determination that a motion vector of the current block is derived from more than one motion vector predictor, the method further comprises determining that the current block is not coded in the LIC mode.

13. The method of claim 1, wherein, in response to a determination that a motion vector of the current block is derived from more than one motion vector predictor, the method further comprises determining that the current block is coded in the LIC mode when an LIC flag associated with any one of the more than one motion vector predictors indicates that an LIC mode is enabled.

14. The method of claim 1, wherein, in response to a determination that a motion vector of the current block is derived from more than one motion vector predictor, the method further comprises determining that the current block is not coded in the LIC mode when an LIC flag associated with any one of the more than one motion vector predictors indicates that an LIC mode is not enabled.

15. The method of claim 1, wherein the inferring the LIC flag and the determining that the current block is coded in the LIC mode based on the LIC flag are performed without using the temporal buffer or a spatial buffer.

16. The method of claim 1, wherein the performing the inter prediction and the determining the set of LIC parameters are completed based upon a single access of a memory.

17. The method of claim 1, further comprising disabling a generalized bi-prediction for the current block when the current block is coded in the LIC mode.

18. An apparatus, comprising:
processing circuitry configured to:
in response to a determination that a motion vector predictor of a current block is a temporal predictor,
determine that the current block is not coded in a local illumination compensation (LIC) mode,
infer an LIC flag of the current block as OFF such that the LIC flag is not stored in a temporal buffer of the apparatus, and
perform an inter prediction for the current block;
in response to a determination that the motion vector predictor for the current block is a spatial predictor,
determine that the current block is coded in the LIC mode based on an LIC flag associated with the motion vector predictor for the current block,
determine a set of LIC parameters for the current block, and
reconstruct the current block based on the set of LIC parameters.

19. A non-transitory computer-readable storage medium storing a program executable by at least one processor to perform:
in response to a determination that a motion vector predictor of a current block is a temporal predictor,
determining that the current block is not coded in a local illumination compensation LIC mode, inferring an LIC flag of the current block as OFF such that the LIC flag is not stored in a temporal buffer of a decoder, and performing an inter prediction for the current block;

in response to a determination that the motion vector predictor for the current block is a spatial predictor, determining that the current block is coded in the LIC mode based on an LIC flag associated with the motion vector predictor for the current block, determining a set of LIC parameters for the current block, and reconstructing the current block based on the set of LIC parameters.

\* \* \* \* \*